United States Patent

Phillips et al.

[15] 3,644,714

[45] Feb. 22, 1972

[54] SYSTEM FOR TRANSLATING DATA FROM A DISPLAY INTO ELECTRICAL SIGNALS SUITABLE FOR STORAGE

[72] Inventors: Donald G. Phillips, 904 Stokes Avenue, Collingswood, N.J. 08108; Robert J. Lubonski, 430 W. Browning Road, Am-8, Bellmawr, N.J. 08030

[22] Filed: May 21, 1969

[21] Appl. No.: 826,402

[52] U.S. Cl. ............. 235/61.11 E, 235/61.6 A, 340/347 AD, 328/120, 250/219 QA

[51] Int. Cl. ............. G06k 11/00

[58] Field of Search ............. 235/61.115 G, 198, 61.6 A; 340/347; 328/120; 250/219 IA

[56] References Cited

UNITED STATES PATENTS

| | | | |
|---|---|---|---|
| 2,881,416 | 4/1959 | Hosken | 235/61.11 |
| 3,153,141 | 10/1964 | Ahrens | 340/347 |
| 3,197,761 | 7/1965 | Arthur et al. | 340/347 |
| 3,251,055 | 5/1966 | McIntosh et al. | 340/347 |
| 3,435,352 | 3/1969 | Miller | 328/120 |
| 3,335,408 | 8/1967 | Oliver | 235/61.6 |

OTHER PUBLICATIONS

IBM Tech. Disclosure Bull., Vol. 2, No. 4, Dec. 1959, "Missing Pulse Detector," by Jenny.

*Primary Examiner*—Thomas A. Robinson
*Attorney*—Edward M. Farrell

[57] ABSTRACT

A system for translating data from a chart into electrical signals includes means for focusing the chart on to a storage tube. The tube is electrically scanned by horizontal and vertical sweep signals. When line crossings on the chart displayed during said scanning operation are encountered output signals are produced. The output signals are compared with one of the sweep signals to obtain analog voltage signals representative of the line crossings. The analog signals may be suitably converted to digital signals for storage in a suitable storage medium.

4 Claims, 5 Drawing Figures

INVENTORS
DONALD G. PHILLIPS
ROBERT J. LUBONSKI
BY
Edward M Farrell
ATTORNEY

INVENTORS
DONALD G. PHILLIPS
ROBERT J. LUBONSKI

BY Edward M. Farrell
ATTORNEY

INVENTORS
DONALD G. PHILLIPS
ROBERT J. LUBONSKI
BY
Edward M. Farrell
ATTORNEY

INVENTORS
DONALD G. PHILLIPS
ROBERT J. LUBONSKI
BY
Edward M. Ferrell
ATTORNEY

SYSTEM FOR TRANSLATING DATA FROM A DISPLAY INTO ELECTRICAL SIGNALS SUITABLE FOR STORAGE

The present invention relates to a new and improved system for the conversion of visual information into digital form, and in particular to systems useful in the conversion of X versus Y graphic points into digital quantities for presentation to data processing equipment for recording, analysis, storage, comparison, reproduction and other processing means.

With the increasing daily gathering of information of all types in graphical form, millions of sheets of information are stored in libraries of institutions, government agencies and private research organizations.

With the advent of high-speed data processing equipments, it has become necessary to provide means for locating, comparison, reproduction and analysis of this multitude of data by methods of quick and automatic translation of data into processing language.

In certain specialized industries, for example those involved in the identification and analysis of chemical elements in compounds, many research organizations have compiled vast libraries of charts showing the compositions of compounds. These charts are generally made by bombarding the substance with electromagnetic energy of some form and measuring of the relative absorption or transmittance through a specified range of frequencies. The activity versus frequency portion relates to the X, or horizontal axis upon the graph, and to the relative mass of the elements contained in the compound. The vertical, or Y axis refers to the quantitive analysis of the compound, giving information relating to the amount of each element contained in the compound.

Frequently, it is required that a compound be identified by comparison of its spectral response curve with those of known compounds, for which complete analyses have been previously made and recorded. To retrieve this information manually is extremely difficult, time consuming and expensive.

The use of high-speed data processing equipment used in other applications would be highly desirable in fields involving chart data. Conversion of the points upon a spectrograph of the unknown compound into digital information, for example, would allow computer comparison of the unknown with all spectra of that type on record to provide library location or actual data from the computer or other source. If no data has been recorded concerning the compound in question, the computer can be instructed to analyze the data presented to it and print out the results.

Furthermore, with the addition of a digitizing tape recorder, data from such charts may be recorded for storage against the time when retrieval and use may be indicated.

It is an object of this invention to provide an improved system for yielding digital information from visual displays.

It is a further object of this invention to provide an improved electronic optical scanning system by means of which visual information may be converted into digital quantities for use by data processing systems.

Yet a further object of this invention is to provide high-speed electronic optical scanning of visual information for on-line interface to high speed data processing systems.

Still a further object of this invention is to provide a means for detection of missing information (gaps on a graph) so as not to lose continuity of data.

An even further object of this invention is to make it compatible with either analog or digital data processing systems.

It is another object of this invention to provide simultaneous X versus Y coordinates in such a manner as to require but one computer word for location of these coordinates upon a graph or display.

Furthermore, it is an object of this invention to provide improved systems for comparison, location, analysis and reproduction of new and/or previously recorded data.

While the subject invention may be generally understood by references to charts in the chemical and medical fields, it will become obvious that digitizing coordinates on a graph is but one of the possible applications of the present invention. Interface equipment are either available or can be designed to handle such variegated assignments as:

a. Card reading
b. Character recognition
c. Satellite and aerial mapping (topography)
d. Schematic diagram reading
e. Reading from cathode-ray tube presentations
f. Reading microfilms
g. Fingerprint comparison, sorting and analysis
h. Voiceprint comparison, sorting and analysis
i. Industrial control systems
j. Air traffic control applications In accordance with the present invention, a system is provided for translating data from an optical display into electrical signals capable of being stored in a storage device. The display is focused on to a storage tube. The display is then electronically scanned by sweep signals. Line crossings are detected to produce output signals. The output signals are compared with one of the sweep signals to obtain voltages representative of the line crossings. These voltages may be converted to electrical signals suitable for storage in a storage medium.

Other objects and advantages of the present invention will be apparent and suggest themselves to those skilled in the art, from a reading of the specification and claims, in conjunction with the following drawings, in which:

In describing the present invention, it will be assumed that 1,500 points along a graph are to be converted to digital quantities. It will be further assumed that the associated digitizing equipment permits a maximum of 30 points per second and that it requires a command pulse of 10–22 microseconds duration to perform its function.

Figure 1:
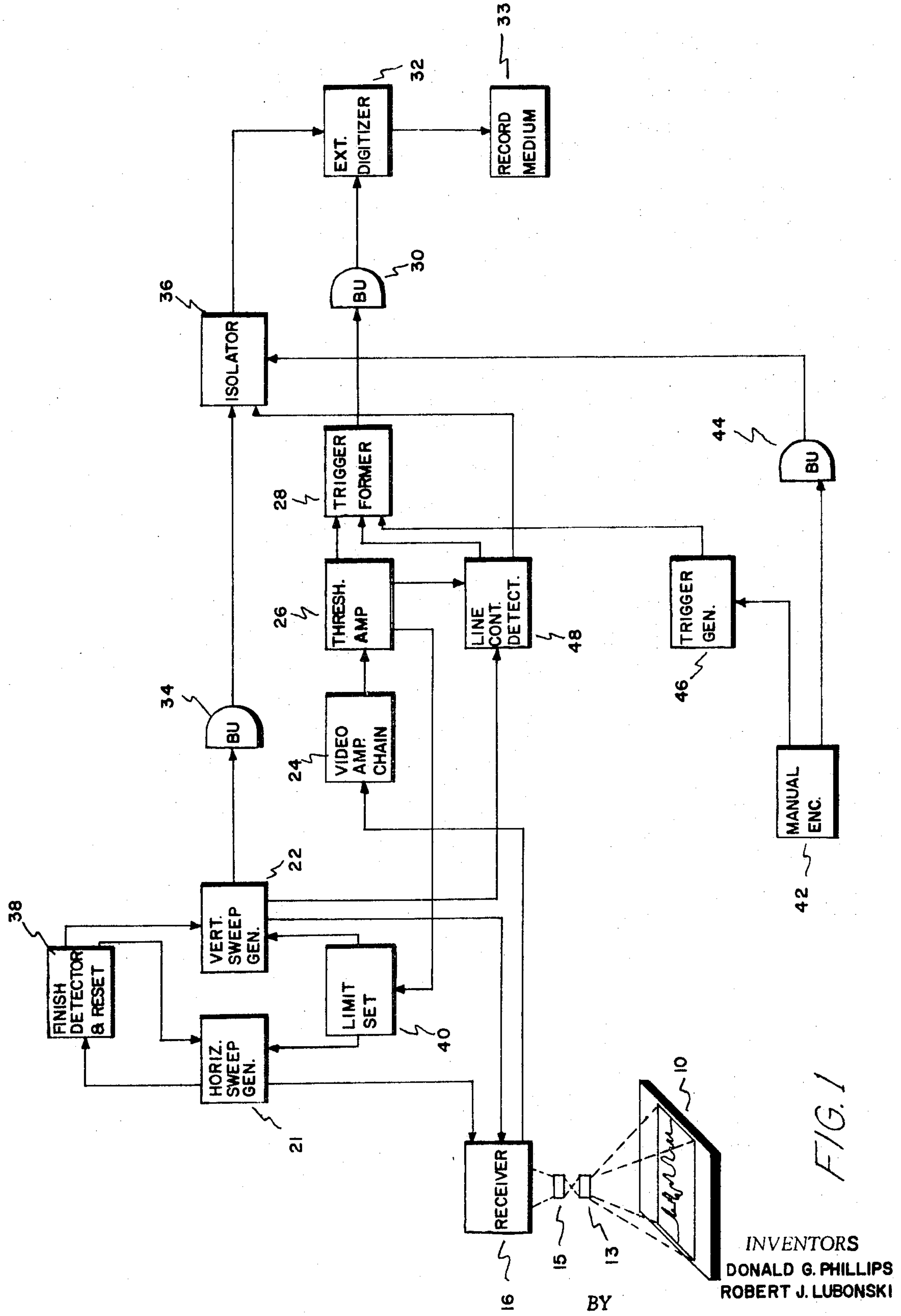
FIG. 1 is a block diagram illustrating an electronic system for translating and storing data from a display, in accordance with the present invention.
Figures 2, 5:
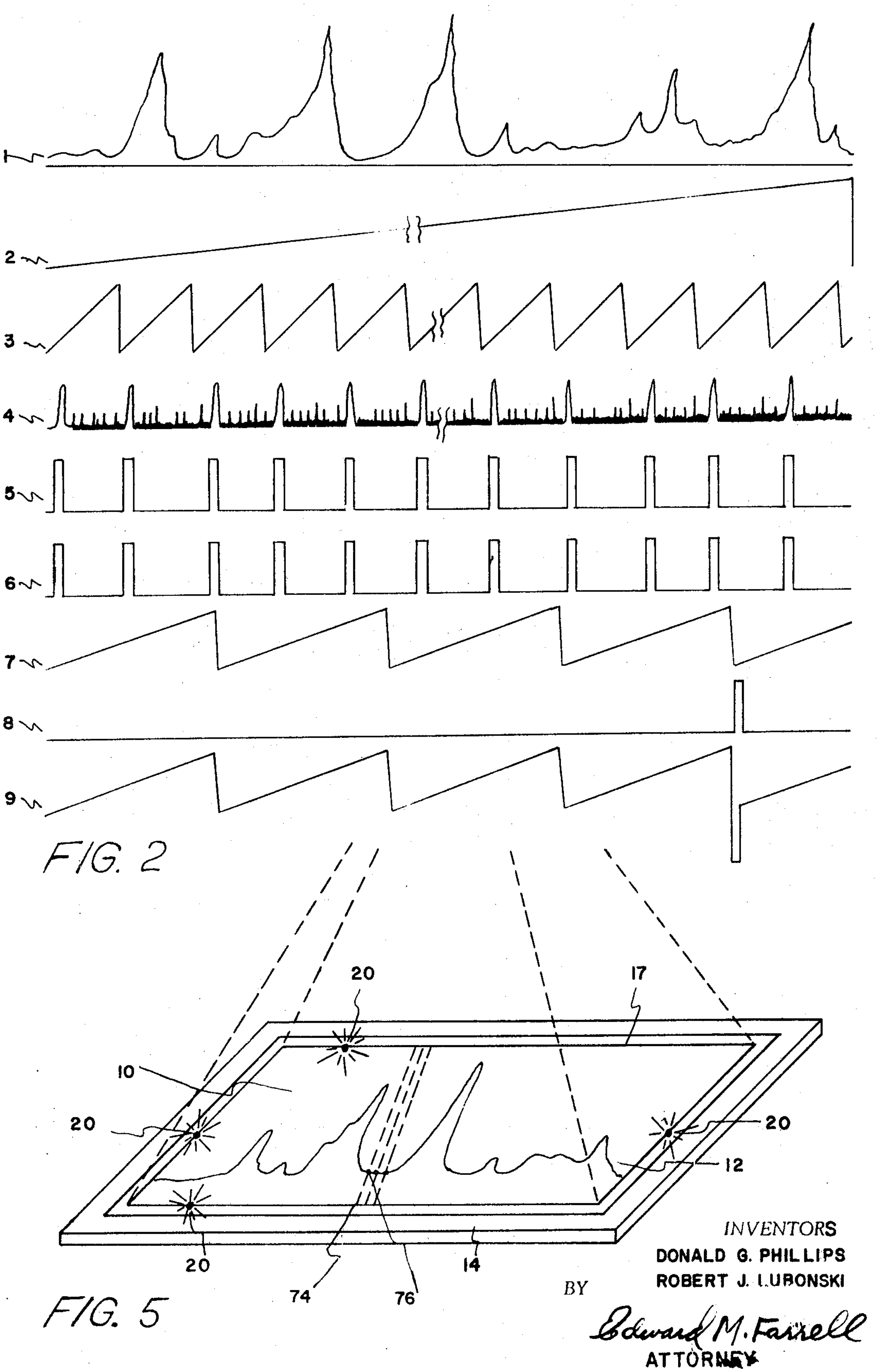
FIG. 2 is a series of waveforms, shown for the purpose of explaining the operation of the system illustrated in FIG. 1, the subsystem shown in FIG. 3 and the circuit presented in FIG. 4.
FIG. 5 illustrates an enlarged view of a chart such as the one shown in FIG. 1.

Referring to FIGS. 1, 2, and 5 of the drawing, a chart 10 includes a line or lines 12. The chart 10 may be placed on a table 14 in a suitable position. The data on the chart 10 is focused through an optical system including lenses 13 and 15 on to a device 16. The device 16, for example, may be a storage tube, such as a vidicon tube.

In one embodiment of the invention, the chart 10 may be positioned on the table 14 with sources of light 20 being disposed beneath the table and the chart to permit alignment of the chart. The table 14 may include a pin point lighting system, illustrated by spots 20. The chart 10 may include dark marginal lines 17 to be aligned with the light spots 20. Other means for automatically positioning the chart to the correct position may of course be provided.

A pair of sweep generators 21 and 22 produce saw tooth electrical signals which are applied to a scanning head which may be associated with the storage device 16. For purposes of explanation, the saw tooth generators 21 and 22 will be considered as horizontal and vertical sweep generators, respectively, with the sweep signals being applied to a scanning head of the storage device 16.

The sweep signals from the sweep generators 21 and 22 provide deflection of an electron beam within the scanning head of the storage device 16. The scanning head may comprise a commercially available closed-circuit television camera, modified to accept sweep signals of the type used in the present invention. As is well known to those skilled in the art, the horizontal deflection signal voltage will cause an electron beam to be deflected from side to side while the vertical deflection signals voltages will cause a top to bottom deflection of the electron beam.

Unlike the conventional sweep circuits in television systems, the present invention involves a number of vertical sweep signals to one horizontal sweep signal. In accordance with one embodiment of the present invention, the horizontal sweep signal requires 1,500 times the duration of the vertical sweep signal for one sweep. It may, therefore, be seen that while the chart is slowly scanned from left to right once, from bottom to top there will have been 1,500 successive vertical scans. Vertical scans 74 crossing the line of the chart are illustrated in FIG. 5. The crossover points of the vertical scans are illustrated at points 76 in FIG. 5. For each vertical scan, 1/1,500th of the chart will be read. Therefore, resolution of the system would be approximately 0.00067 the length of the chart. Line 1 of FIG. 2 may represent a line on a chart. Lines 2 and 3, respectively represent the horizontal and vertical sweep signals.

A scanning head as is well known in the art, produces pulses of current corresponding to changes in the intensity of light reflected from the surface being scanned. These changes are illustrated in line 4 of FIG. 2. As is understood by those skilled in the art, the changes in intensity produced by grid lines and plotted lines on a graph are sufficient to produce discrete current pulses of useful magnitude. Narrow lines will produce smaller pulses than wide lines. It is also known that the ink pens used in chartmaking machines produce lines which are wider and darker than the grid lines of the chart. Therefore, the plotted line may be separated from the grid lines by electronic means, as will be shown.

Current pulses, as illustrated in line 4 of FIG. 2, are generally on the order of a few microvolts and are extremely short in duration. These signals are applied to a video amplifier 24 for amplification to useful levels.

In order to separate the grid line pulses from those representing the plotted line, the amplified video pulses are fed to a threshold amplifier 26 which is biased in such a manner as to allow only those pulses above a certain amplitude to be amplified. Such threshold level control circuits are well known to those skilled in the art. For example, an amplifier may normally be biased beyond cut off and become conductive to produce output signals only when the bias is overcome by relatively large signals. The grid line pulses, being of relatively low amplitude, are thus ignored by the threshold amplifier 26 and only the signals representing the plotted line of the chart are produced, as illustrated in line 5 of FIG. 2.

The plotted line signals from the threshold amplifier 26 are applied to a trigger former circuit 28, which squares the signals to produce output signals as illustrated in line 6 of FIG. 2. The trigger forming circuit may be a monostable multivibrator to produce pulses of uniform width and in one embodiment of the present invention the pulses may be in the order of 15 microseconds duration.

The trigger pulses are applied through a buffer stage 30 to a digitizer circuit 32. At the same time, a calibrated sample of the vertical deflection signal, as illustrated in line 7 of FIG. 2, is applied through a buffer stage 34 and isolator amplifier 36 to the digitizer 32. The output signals from the digitizer are applied to a record medium 33 which may be a tape in a computer system. The vertical sweep signal of line 7 is an expanded version of the vertical sweep signals of line 3, being expanded for purposes of explanation. Lines following line 7 are also expanded.

At this time, some point along the vertical analog signal is coincident with the trigger pulse fed to the digitizing tape recorder. As this trigger pulse was formed at the time when the vertical scan crossed the plotted line on the graph, it is obvious that the level to which the vertical signal has risen at this time is directly analogous to the position of a point upon the plotted line in the Y, or vertical axis of the graph. Therefore, if the voltage at this time is measured and converted into digital form, data processing equipment will then be able to follow the amplitude variations of the plotted curve within the vertical limits of the graph. In effect, the trigger signals tells the digitizer when to measure the vertical sweep signal.

Horizontal accuracy is provided due to the precise time relationship between single vertical sweep signals, and the level at which trigger pulses are produced. Equating the vertical sweep voltage level to the time of trigger pulse production, one can expect a high degree of accuracy in the determination of the horizontal, or X-axis position, of each point scanned along it:

The vertical sweep rate is 30 Hz.

Therefore, $Ts=1/30$, or 33,333 microseconds, where $Ts$ is the time of one sweep signal. S indicates the time between the trigger signals causing the sweep signals. Thus, 2S=66,667 microseconds, and the time between a trigger pulse, T1 and the next trigger pulse, T2, cannot exceed 66,667 microseconds.

If peak sweep voltage, Vs, were 10 v., then each 0.1 volt point would be 1 percent of the total. Therefore, the 4-volt level at T1 would represent 40 percent of Sweep 1 and the 9-volt level at T2 would be 90 percent of Sweep 2.

Thus, the time between pulses would be 60 percent of S1 plus 90 percent of S2, or 150 percent of S.

Thus it is seen that:

$$1.5\ (66{,}667)=100{,}000.5 \text{ microseconds.}$$

If the calibration of the chart FIG. 2, line 1, is 200 to 4,000 $CM^{-1}$, where CM is centimeters, this indicates 3,800 discrete points. The scanner will scan a total of 1,500 of these at 30 per second or in:

$$1{,}500/30=50 \text{ seconds, or } 50{,}000{,}000 \text{ microseconds or } 5\times10^{7} \text{ microseconds.}$$

Equating microseconds, $$\text{microseconds to } CM^{-1}=5\times10^{7}/3{,}800=13{,}157.9 \text{ microseconds}/CM^{-}D1$$

As the first trigger pulse appears at 4 volts, or 40 percent of S1, the elapsed time to this point is 13,333.2 microseconds, or 1.03 $CM^{-1}$. Therefore, the frequency at T1 is 3,998.99 $CM^{-1}$.

To the end of S1, 60 percent of the sweep remains, and from the end of S1 to T2, 90 percent of S2 remains.

Therefore, T2–T1=1.58, or 16,665.5 microseconds, and 16,666.5/13,157.9=$\Gamma^{1.25}$ $CM^{-1}$ Therefore, T2 will appear at: 3,998.99–1.25=3997.74 $CM^{-1}$ The greatest difference between outputs will be 2.533 $CM^{-1}$, which will be a practically impossible sharp peak. Therefore, the computer need only be instructed in terms of volts per graphical unit to accomplish such fantastic accuracy in both the horizontal and vertical axes.

In order to implement the overall system described, a number of novel features are included. These features include means for detecting the finish of a scanning operation, means for resetting the system to commence a scanning operation, means for detecting and compensating for a discontinuity of the lines in the chart and means for providing coding signals to identify different types of charts which may be used in the system.

A finish detector and reset circuit 38 controls the start of operation of the sweep generators 21 and 22. At the end of one scanning operation, the sweep generators are reset to permit the starting of the next operation.

A limit set circuit 40 detects the output signals from the threshold amplifier 26. Sensitivity control means for controlling the sensitivity of the system may be included here so that the system will respond to data and not respond to undesirable signals. The limit set circuit 40 serves to narrow or expand the sweep signals so that the precise area of the chart 10 is scanned. The widths and heights of the sweep signals are controlled in the circuit 40. Various manual adjustment may be included in this circuit prior to use in actual operations.

Means for producing encoding signals for different types of charts is provided by a manual encoder 42 to produce signals, which are applied through a buffer circuit 44 to the isolator circuit 36. The output signal from the manual encoder 42 may be a voltage step analog of the encoded digit ranging from 1 to 10 volts DC. This voltage is applied through the isolator circuit 36 to the digitizer 32.

The output signal from the encoder 42 is also applied to a trigger generator circuit 46. The output signal from the trigger generator circuit 46 is applied to the trigger former circuit 28. The digitizer 32 receives the manual data signals which are stored to provide identification and processing information for a main computer. The signals may be used for purposes other than to identify charts, such as dates, etc.

An important feature of the subject invention relates to means for accurately translating and storing data from a display in which parts of the data are missing. Occasionally, in the recording of such charts as have been herein discussed, the inking pen which is used as a part of the recording apparatus may have a tendency to skip and cause a gap in the data line. The gap may be several scale divisions in length.

The circuits embodied in the present invention are arranged in such a manner that each time the scan crosses the plotted line, a trigger is fed to the digitizing unit instructing it to measure the level of voltage present at its analog input at that time. If there is no plotted line, there would be no trigger pulse fed to the digitizer and consequently, no data for that point. If any scan crosses missing data points, the horizontal, or X-axis would be compressed by the amount of the data gap, and horizontal accuracy would be lost.

Therefore, the present invention provides circuits which detect the data gap, trigger the digitizer at each scan, and feed it a voltage which the data processing equipment may be instructed to regard as an information gap thereby preserving continuity of data, as will be seen. A line continuity detector 48, illustrated in the form of a block in FIG. 1, is more fully illustrated in FIG. 3.

Figure 3:
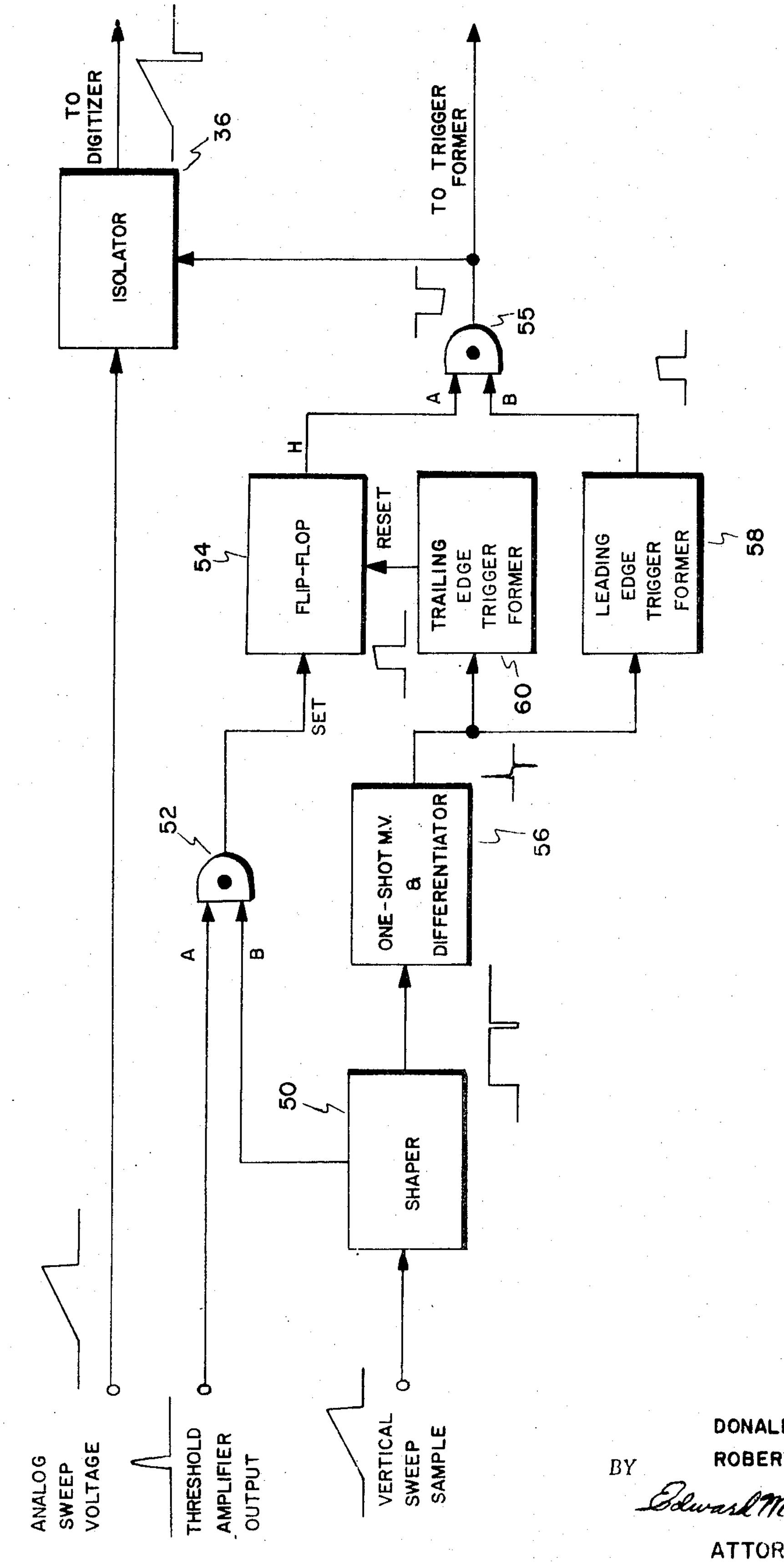
FIG. 3 is a logic flow diagram illustrating the means by which missing data may be detected, in accordance with the present invention.

Referring particularly to FIG. 3 along with FIGS. 1 and 2 and assuming a graph plot with no data gaps, the calibrated sample of the vertical sweep voltage from the vertical sweep generator 22 is fed through the buffer circuit 34 to the digitizer 32. At the same time, another sample of the same signal is fed to the input of a shaper circuit 50, where it is squared and fed simultaneously to two circuits. The first of these circuits is a Diode-Transistor logic (DTL) "AND"-gate circuit 52 which produces an output signal only if its two inputs are positive at the same time.

As the square wave enters the AND-gate 52, it is integrated so that as long as vertical sweep signals are applied, a continuous positive voltage will be present at input "B" of the AND-gate 52. Meanwhile, a shaped sample of the detected video signal from the threshold amplifier 26 is applied to input "A" of the AND-gate 52. Therefore, each time the scan crosses the plotted line, both inputs of the AND gate will be high, and it will produce an output pulse at this time. This output pulse is applied to the SET input of a flip-flop 54 circuit causing it to change state. The flip-flop 54 is arranged in such a way that in the untriggered state, its output is high. This output is fed to the "A" input of another DTL AND-gate circuit 55.

Meanwhile, at the output of the shaper circuit 50, the second portion of the square wave signal is fed to the input of a monostable, or one-shot multivibrator circuit 56. The one-shot circuit is arranged in such a way as to trigger only on the trailing edge of the input pulse. It must be remembered that this trailing edge represents the end of the vertical sweep signal.

The output signal of the one-shot multivibrator circuit 56 comprises a narrow pulse, approximately 100 microseconds in duration. This pulse is then differentiated to produce a positive and a negative spike with the positive spike occuring at the leading edge and the negative spike occuring at the trailing edge of the pulse signal.

The differentiated signal from the circuit 56 is then coupled to two trigger former circuits 58 and 60. The leading edge trigger former 58 accepts only the leading (or positive) edge of the differentiated signal, which represents the exact time when the vertical sweep ended. The leading edge trigger former 58 produces a square positive pulse at the end of each vertical sweep, and feeds it to the input of the DTL AND-gate circuit 55.

If, by this time a video signal has not been received from the scanning head, a data gap is indicated. The output of the flip-flop circuit 54 will be high and the pulse signal from the leading edge trigger former 58 will cause the gate 55 to trigger, producing a positive pulse which is fed to the isolator 36 and the trigger former 28.

The signal applied to the isolator circuit 36 interrupts the sweep signal fed through it and produces a negative output pulse. (See lines 8 and 9 of FIG. 2)

The signal fed to the trigger former circuit 28 causes a command pulse to be sent to the digitizer 32, instructing it to measure the negative pulse at the output of the isolator circuit 36. As no point along the graph can produce a negative voltage under normal conditions, the processing equipment can be instructed to regard a negative voltage as an indication of missing data and compensate accordingly. About 100 microseconds after completion of the foregoing described operation, the negative portion of the differentiated signal from the one-shot multivibrator circuit 56 is applied to the trailing edge pulse shaper circuit 60. This circuit is constructed such that it will be activated only be a negative-going input signal. At this time, it produces a positive pulse, which is applied to the RESET input of the flip-flop circuit 54 and returns the flip-flop to its original condition. If the flip-flop 54 has not changed states, due to missing data, the circuit is unaffected by the RESET pulse and is therefore ready for action during the next vertical sweep.

If, in the process of a scanning operation, it is desired to return the sweeps to zero, the reset circuit 38 is provided. This circuit is shown schematically in FIG. 4.

Figure 4:
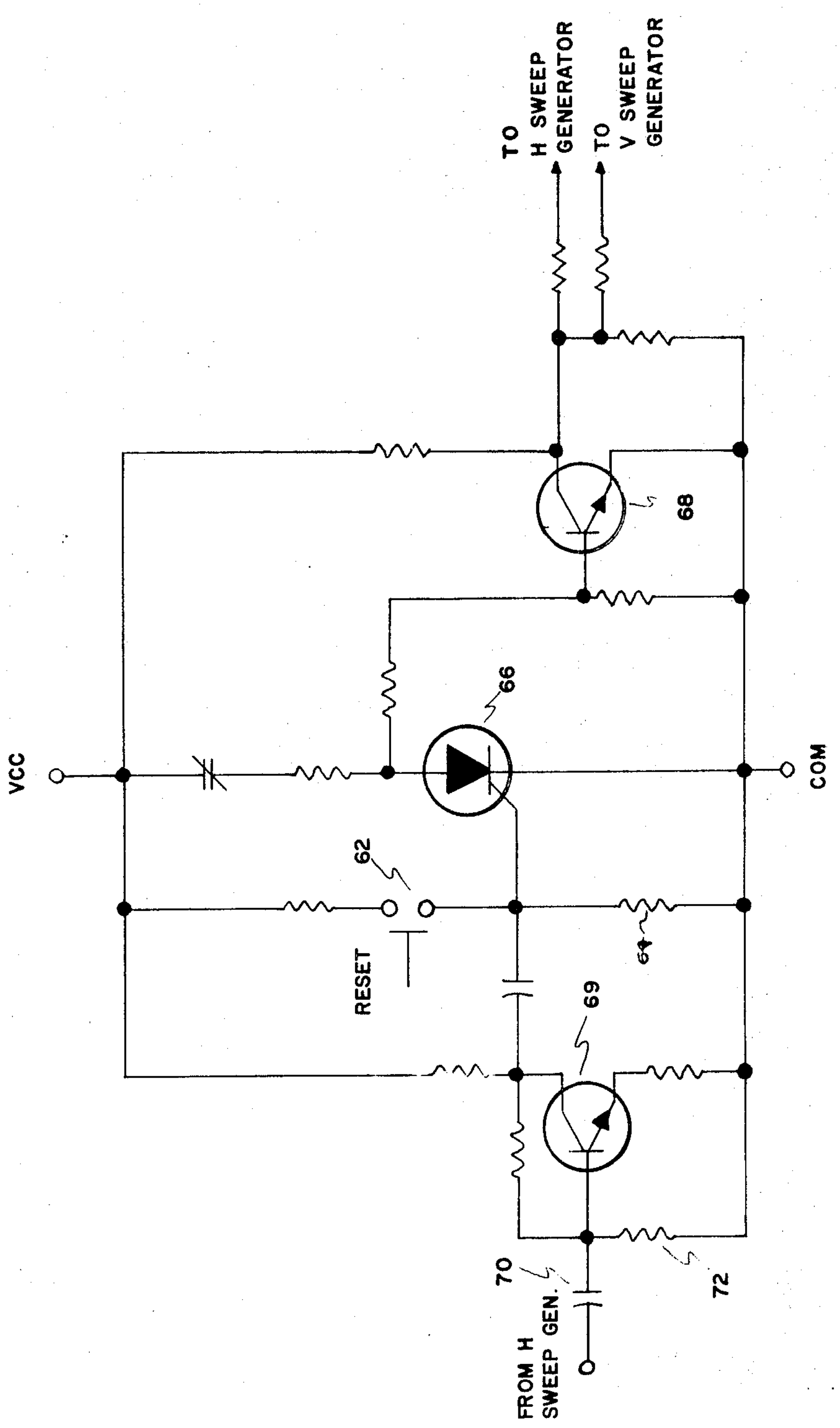
FIG. 4 is a schematic diagram illustrating the means by which a scanning system may be returned to a standby condition after the necessary data has been retrieved from a visual display, in accordance with the present invention.

Referring to FIG. 4, when the spring-return "Reset" switch 62 is depressed, sufficient voltage is developed across resistor 64 to trigger a silicon-controlled rectifier 66. This action causes the anode to fall to a very low potential near zero volts. Transistor 68 is biased in such a way as to make it normally conducting. When the silicon-controlled rectifier 66 is triggered, transistor 68 cuts off, and its collector voltage rises to B+. This change in level is fed to the horizontal and vertical sweep generators, where it is used to cause the sweeps to stop and return to zero.

Transistor 69 is the Finish Detector. Differentiator circuit including a capacitor 70 and a resistor 72 accepts a sample of the long horizontal sweep, but due to its extremely short time-constant, the relatively slow rise of the horizontal sweep will not affect it. However, when the fast trailing edge of the sweep is applied, the circuit reacts by producing a short negative spike. The spike is then amplified by transistor 69, shaped, and used to trigger the silicon reset 66, and the sweep-stopping action previously discussed takes place.

The present invention has been described in connection with data from a chart. It is apparent that this data may be related to a number of different fields and include chemical charts used to identify different chemical compounds. The chart may also include data relating to medical conditions. For example, electrocardiogram charts may be compared or studied to diagnose physical conditions of patients easily and quickly. In some cases, business charts may be studied to arrive at fast comparisons of certain aspects of business. While a chart with only a single line has been described, in some situations the chart may involve a plurality of lines for translation, storage, and study. Complex single line wave forms including signal envelopes may be interpreted with the present invention.

Libraries of charts in different fields could be built up by translating the data into digital form for storage. The storage may involve a magnetic tape, drums or disc. Means for storing data for comparison with masses of other data stored on a recording medium are well known. A particular item is sequentially compared with the items on the recording medium until a comparator indicates some predetermined relationship or identity.

Details relating to the operation of the overall computer have been omitted for purposes of clarity because they are well known to those skilled in the art and are only incidentally related to the present invention.

What is claimed is:

1. A system for transferring information from a display including a chart with at least one line thereon into electrical signals, said system comprising a storage medium for receiving and storing information from said display, lens means disposed between said display and said storage medium for focusing said display on to said storage medium to produce a stored display on said storage medium, said stored display including a stored line representing said line on said chart, means for generating a pair of electrical sweep signals, said pair of sweep signals comprising linear voltages to cause an electron beam to sweep the entire area of said storage medium whereby the points of intersection of said stored line of said stored display by said sweep signals represent points along said line on said chart, one of said sweep signals comprising a vertical sweep signal representing a range of linear voltage levels for scanning said focused stored display vertically transverse to said stored line on said stored display, with the other sweep signal comprising a horizontal sweep signal for scanning said focused stored display horizontally, means for normally generating an output signal each time one of said vertical sweep signals crosses said stored line on said stored display, means to detect the absence of an output signal during any one of said vertical sweep signals, and means for detecting the points of line crossings of said stored line by said vertical sweep signals to produce voltages representative of the locations of said line crossings.

2. The invention as set forth in claim 1 wherein said output signals are direct current voltages and wherein an analog converter circuit is included to convert said voltages into binary coded signals capable of being stored on said storage medium.

3. The invention as set forth in claim 2 wherein means are provided to start said sweep signals at the beginning of said display and to discontinue said sweep signals at the end of one scanning operation.

4. The invention as set forth in claim 3 wherein an encoder circuit is provided to produce coding signals to be applied to said storage medium along with said output signals produced by said line crossings.

* * * * *